US006355936B1

(12) United States Patent
Mastio

(10) Patent No.: US 6,355,936 B1
(45) Date of Patent: Mar. 12, 2002

(54) CIRCUIT FOR ELECTRICAL INSULATION BETWEEN A TWO-WAY BUS AND A PERIPHERAL CIRCUIT

(75) Inventor: Daniel Mastio, Trets (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/271,467

(22) Filed: Mar. 17, 1999

(30) Foreign Application Priority Data

Mar. 17, 1998 (FR) ............................................. 98 03500

(51) Int. Cl.⁷ ................................................ H04B 9/00
(52) U.S. Cl. ....................................... 250/551; 324/514
(58) Field of Search .......................... 250/551; 327/514, 327/515, 551

(56) References Cited

U.S. PATENT DOCUMENTS

| 4,178,504 A | 12/1979 | Farmer ........................ 250/551 |
| 5,406,091 A | 4/1995 | Burba et al. ................. 250/551 |
| 5,514,875 A | 5/1996 | Krause ........................ 250/551 |

FOREIGN PATENT DOCUMENTS

EP    0 066 180    12/1982

OTHER PUBLICATIONS

European Search Report dated Jan. 19, 1999 with annex on French Application No. 9803500.

*Primary Examiner*—F. L. Evans
(74) *Attorney, Agent, or Firm*—Lisa K. Jorgenson; Stephen Bongini; Fleit, Kain, Gibbons, Gutman & Bongini P.L.

(57) ABSTRACT

An electrical insulation circuit of the type connected between a peripheral circuit and a two-way bus. The electrical insulation circuit includes first and second optocouplers for transmitting differential signals in the peripheral circuit-to-bus direction, and third and fourth optocouplers for transmitting differential signals in the bus-to-peripheral circuit direction. The first and third optocouplers are associated with a first signal terminal on the peripheral circuit side and with a first data wire on the bus side, and the second and fourth optocouplers are associated with a second signal terminal on the peripheral circuit side and with a second data wire on the bus side. Further, the first and third optocouplers and the second and fourth optocouplers are connected such that the first and second optocouplers are off during transmission in the bus-to-peripheral circuit direction and the third and fourth optocouplers are off during transmission in the peripheral circuit-to-bus direction. In a preferred embodiment, the first and second optocouplers each include a light-emitting diode on the peripheral circuit side and a phototransistor on the bus side, and the third and fourth optocouplers each include a light-emitting diode on the bus side and a phototransistor on the peripheral circuit side.

19 Claims, 1 Drawing Sheet

CIRCUIT FOR ELECTRICAL INSULATION BETWEEN A TWO-WAY BUS AND A PERIPHERAL CIRCUIT

CROSS-REFERENCE TO RELATED APPLICATIONS

This application is based upon and claims priority from prior French Patent Application No. 98-03500, filed Mar. 17, 1998, the entire disclosure of which is herein incorporated by reference.

BACKGROUND OF THE INVENTION

1. Field of the Invention

The present invention relates to electronic circuits, and more specifically to a circuit for electrical insulation between a two-way bus and a peripheral circuit.

2. Description of Related Art

There are conventional circuits based on optocouplers that provide electrical insulation between two systems having different electrical natures. An optocoupler is generally in the form of a package having a light-emitting diode and a phototransistor. When a current flows through the diode, it emits photons that make the phototransistor conductive. Thus, the optocoupler enables the transmission of electrical signals while providing excellent electrical insulation between its input and output. For example, an optocoupler makes it possible to couple low voltage circuits with circuits connected to the main without any risk of recovering the main's voltage in the low voltage circuits.

This type of electrical insulation circuit is especially suited for setting up a connection between peripheral circuits and the communications bus of a computer system. In particular, there are conventional insulation circuits for linking an RS-232 bus with peripheral circuits. The bus includes a first data wire for transmitting data in the peripheral circuit-to-bus direction and a second data wire for transmitting data in the opposite direction. The peripheral circuit can be an external supply of the inverted rectifier type that can sometimes produce dangerously high voltages. Thus, an optocoupler is typically positioned on each of the data wires between the bus and the inverted rectifier in order to insulate the inverted rectifier with respect to the bus.

The use of an optocoupler to provide such insulation does not raise any particular difficulties with a bus that has one wire for transmission in one direction and another wire for transmission in the opposite direction. However, a problem involving parasitic feedback of the signals arises when one wire is used to transmit data in both directions. For example, such a situation arises with a USB (universal serial bus), which has a supply wire, a ground wire, and two data wires that convey differential electrical signals in both directions.

SUMMARY OF THE INVENTION

In view of these drawbacks, it is an object of the present invention to overcome the above-mentioned drawbacks and to provide an electrical insulation circuit for connection between a two-way bus and a peripheral circuit that averts parasitic feedback. The transmission of differential signals in both directions is provided by four optocouplers that are connected to one another so as to selectively turn off the operation of two of the optocouplers in the direction of transmission of the signals. In preferred embodiments, additional circuitry prevents the optocouplers that are off from disturbing the transmission of the signals from the optocouplers that are on towards the destination circuit (bus or peripheral circuit).

One embodiment of the present invention provides an electrical insulation circuit of the type connected between a peripheral circuit and a two-way bus. The electrical insulation circuit includes first and second optocouplers for transmitting differential signals in the peripheral circuit-to-bus direction, and third and fourth optocouplers for transmitting differential signals in the bus-to-peripheral circuit direction. The first and third optocouplers are associated with a first signal terminal on the peripheral circuit side and with a first data wire on the bus side, and the second and fourth optocouplers are associated with a second signal terminal on the peripheral circuit side and with a second data wire on the bus side. Further, the first and third optocouplers and the second and fourth optocouplers are connected such that the first and second optocouplers are off during transmission in the bus-to-peripheral circuit direction and the third and fourth optocouplers are off during transmission in the peripheral circuit-to-bus direction. In a preferred embodiment, the first and second optocouplers each include a light-emitting diode on the peripheral circuit side and a phototransistor on the bus side, and the third and fourth optocouplers each include a light-emitting diode on the bus side and a phototransistor on the peripheral circuit side. The first and third optocouplers and the second and fourth optocouplers are connected so that the light-emitting diodes of the first and second optocouplers are off during transmission in the bus-to-peripheral circuit direction and the light-emitting diodes of the third and fourth optocouplers are off during transmission in the peripheral circuit-to-bus direction.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
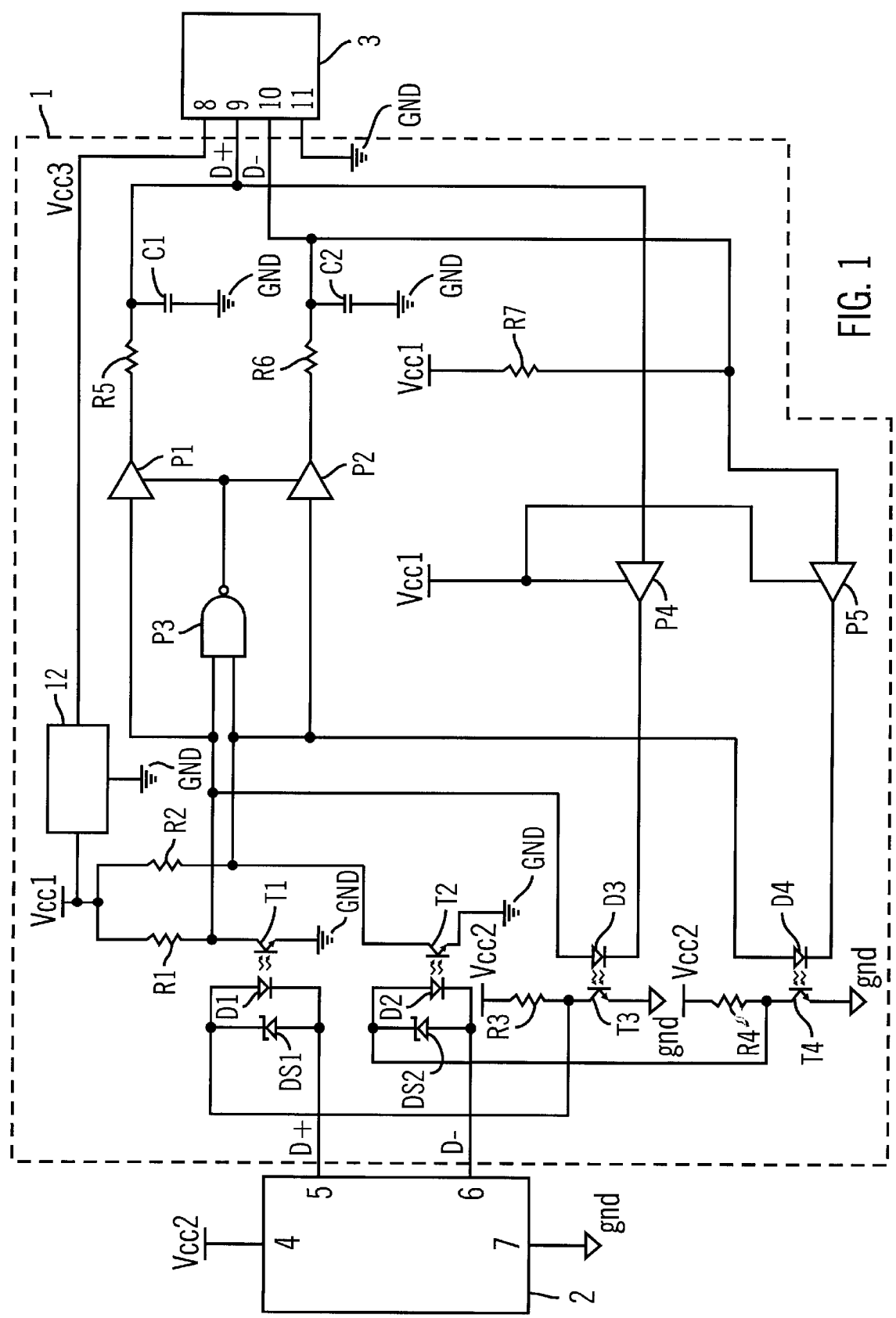
FIG. 1 is a schematic diagram showing an electrical insulation circuit according to a preferred embodiment of the present invention.

Preferred embodiments of the present invention will be described in detail hereinbelow with reference to the attached drawing. In the following description, "0" designates a low logic level and "1" designates a high logic level.

FIG. 1 shows an electrical insulation circuit 1 connected between a peripheral circuit 2 and a two-way communications bus 3. The peripheral circuit 2 includes a supply terminal 4 that receives a supply voltage Vcc2, a ground terminal 7 that is connected to a floating ground gnd, and two signal terminals 5 and 6 that transmit and receive differential data signals. Additionally, pull-up resistors (not shown) are provided in a conventional manner between the signal terminals 5 and 6 and the supply terminal 4. Thus, when there is no signal, a state corresponding to a high logic level is present at the two terminals 5 and 6.

The bus 3 includes a supply wire 8 that conveys a voltage Vcc3, a ground wire 11 that is connected to another ground of the system GND, and two data wires 9 and 10 that are connected through the electrical insulation circuit 1 to the signal terminals 5 and 6. When there is no signal, a state corresponding to a low logic level is present on the two data wires 9 and 10. To transmit differential data signals in the peripheral circuit-to-bus direction, the electrical insulation circuit 1 uses two optocouplers. The first optocoupler is formed by a light-emitting diode D1 (on the peripheral circuit side) and a phototransistor T1 (on the bus side) that cooperates with the diode D1 to transmit a data element from the signal terminal 5 of the peripheral to the data wire 9 of the bus. Similarly, the second optocoupler is formed by a light-emitting diode D2 (on the peripheral circuit side) and a phototransistor T2 (on the bus side) that cooperates with the diode D2 to transmit a data element from the signal terminal 6 of the peripheral to the data wire 10 of the bus.

The light-emitting diodes D1 and D2 and the phototransistors T1 and T2 of the first and second optocouplers are biased as follows. The diodes D1 and D2 have their cathodes respectively connected to the signal terminals 5 and 6 of the peripheral 2 and their anodes respectively connected through resistors R3 and R4 to the supply terminal 4 of the peripheral. The phototransistors T1 and T2 have their emitters connected to the ground wire 11 of the bus and their collectors respectively connected through resistors R1 and R2 to a supply terminal that delivers a voltage Vcc1 from a voltage regulator 12. The voltage regulator provides the insulation circuit with a voltage Vcc1 that is lower than the voltage Vcc3 (e.g., 3.3 volts instead of 5 volts).

The collectors of the transistors T1 and T2 are respectively connected to the data wires 9 and 10 through two tristate transmission gates P1 and P2 that selectively enable the transmission of differential signals in the peripheral circuit-to-bus direction. A signal for activating the transmission gates P1 and P2 is generated by a NAND-type gate P3 whose two inputs are connected to the collectors of the transistors T1 and T2. The gate P3 prevents the transmission of state "11" of the two signal terminals 5 and 6 to the data wires 9 and 10. Thus, during the transmission of signals in the bus-to-peripheral circuit direction, the transmission gates P1 and P2 are not on and the differential signal at the output of the optocouplers D1/T1 and D2/T2 is not transmitted to the bus 3. In the preferred embodiment, lowpass filters formed by resistors R5 and R6 and capacitors C1 and C2 are placed between the output of the transmission gates P1 and P2 and the data wires 9 and 10 in order to filter parasitic signals.

For the transmission of differential data signals in the bus-to-peripheral circuit direction, the electrical insulation circuit 1 uses third and fourth optocouplers. The third optocoupler includes a light-emitting diode D3 (on the bus side) and a phototransistor T3 (on the peripheral circuit side) that cooperates with the diode D3 to transmit a signal on the data wire 9 to the signal terminal 5 of the peripheral. Similarly, the fourth optocoupler includes a light-emitting diode D4 (on the bus side) and a phototransistor T4 (on the peripheral circuit side) that cooperates with the diode D4 to transmit a signal on the data wire 10 to the signal terminal 6 of the peripheral.

The cathodes of the diodes D3 and D4 are respectively connected to the data wires 9 and 10 through two transmission gates P4 and P5. In the preferred embodiment, the transmission gates have their activation inputs permanently connected to the voltage Vcc1 output by the regulator 12, so these two gates are always on and provide the current flowing through the light-emitting diodes D3 and D4 whenever the diodes are on. The anodes of the diodes D3 and D4 are respectively connected to the collectors of the phototransistors T1 and T2. The phototransistors T3 and T4 have their emitters connected to the ground terminal 7 of the peripheral and their collectors respectively connected to the anode of the light-emitting diodes D1 and D2.

The four optocouplers are connected with one another in the manner described above so that the diodes D1 and D2 of the first and second optocouplers are off during bus-to-peripheral circuit transmission and so that the diodes D3 and D4 of the third and fourth optocouplers are off during peripheral circuit-to-bus transmission. The circuit 1 also includes two Schottky diodes DS1 and DS2 that transmit the states at the collector of the transistors T3 and T4 to the signal terminals 5 and 6 of the peripheral 2. The first Schottky diode DS1 is reverse-connected to the terminals of the lightemitting diode D1 and is on when the phototransistor T3 is on. Similarly, the second Schottky diode DS2 is reverse-connected to the terminals of the light-emitting diode D2 and is on when the phototransistor T4 is on.

The operation of the electrical insulation circuit of FIG. 1 will now be explained. When there is no transmission, the pull-up resistors of the peripheral circuit 2 impose a "1" state on the signal terminals 5 and 6. Thus, the diodes D1 and D2 and the transistors T1 and T2 are off, and the gates P1 and P2 are not activated. In the opposite direction, the data wires 9 and 10 are normally in the "0" state. However, a resistor R7 that is connected between the output of the regulator 12 and the data wire 10 imposes the "1" state on the wire 10. Consequently, when there is no transmission, the diode D4 is off and the diode D3 is on. (This allows the transmission of the "00" state to be reserved for indicating the end of a data packet.)

When the peripheral circuit sends signals to the bus corresponding to the "00", "01", or "10" states, the diodes D3 and D4 are permanently off because there is no difference in potential between their terminals, and the Schottky diodes are also off due to their bias. In contrast, the diodes D1 and/or D2 are not on except when transmitting a "0" state. Otherwise, they are off. When the bus 3 transmits signals to the peripheral circuit 2, the diodes D1 and D2 are permanently off due to their bias. In contrast, the diodes D3 and D4 as well as the Schottky diodes DS1 and DS2 are on when a "0" is transmitted to the peripheral circuit. Otherwise, they are off.

Accordingly, the present invention provides an electrical insulation circuit for connection between a two-way bus and a peripheral circuit that averts parasitic feedback. The present invention is especially suited for use in systems having a universal serial bus (USB).

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, other embodiments of the present invention may not include all of the features described above. Therefore, it is intended that the present invention not be limited to the particular embodiments disclosed, but that the invention include all embodiments falling within the scope of the appended claims.

What is claimed is:

1. An electrical insulation circuit of the type connected between a peripheral circuit that includes a supply terminal, a ground terminal, and first and second signal terminals, and a two-way bus that includes at least one supply wire, a ground wire, and first and second data wires, each of the data wires conveying differential data signals in both directions, said electrical insulation circuit comprising:

first and second optocouplers for transmitting differential signals in the peripheral circuit-to-bus direction; and third and fourth optocouplers for transmitting differential signals in the bus-to-peripheral circuit direction, wherein the first and third optocouplers are associated with the first signal terminal on the peripheral circuit side and with the first data wire on the bus side, the second and fourth optocouplers are associated with the second signal terminal on the peripheral circuit side and with the second data wire on the bus side, and the first and third optocouplers and the second and fourth optocouplers are connected such that the first and second optocouplers are off during the transmission of differential signals in the bus-to-peripheral circuit direction and the third and fourth optocouplers are off during the transmission of differential signals in the peripheral circuit-to-bus direction.

2. The electrical insulation circuit as defined in claim 1, wherein the first and second optocouplers each include a light-emitting diode on the peripheral circuit side and a phototransistor on the bus side, the phototransistor cooperating with the diode to transmit the differential signals in the peripheral circuit-to-bus direction, and the third and fourth optocouplers each include a light-emitting diode on the bus side and a phototransistor on the peripheral circuit side, the phototransistor cooperating with the diode to transmit the differential signals in the bus-to-peripheral circuit direction.

3. The electrical insulation circuit as defined in claim 2, wherein the first and third optocouplers and the second and fourth optocouplers are connected so that the light-emitting diodes of the first and second optocouplers are off during the transmission of differential signals in the bus-to-peripheral circuit direction and the light-emitting diodes of the third and fourth optocouplers are off during the transmission of differential signals in the peripheral circuit-to-bus direction.

4. The electrical insulation circuit as defined in claim 1, further comprising:

first means for applying the differential signal from the first and second optocouplers to the first and second data wires of the bus solely during the transmission of signals in the peripheral circuit-to-bus direction; and second means for applying the differential signal from the third and fourth optocouplers to the first and second signal terminals of the peripheral circuit solely during the transmission of signals in the bus-to-peripheral circuit direction.

5. The electrical insulation circuit as defined in claim 4, wherein the first and second optocouplers each include a light-emitting diode on the peripheral circuit side and a phototransistor on the bus side, the phototransistor cooperating with the diode to transmit the differential signals in the peripheral circuit-to-bus direction, and the third and fourth optocouplers each include a light-emitting diode on the bus side and a phototransistor on the peripheral circuit side, the phototransistor cooperating with the diode to transmit the differential signals in the bus-to-peripheral circuit direction.

6. The electrical insulation circuit as defined in claim 5, wherein the light-emitting diode of the first optocoupler has its anode connected though a first resistor to the supply terminal of the peripheral circuit and its cathode connected to the first signal terminal of the peripheral circuit, the light-emitting diode of the second optocoupler has its anode connected through a second resistor to the supply terminal of the peripheral circuit and its cathode connected to the second signal terminal of the peripheral circuit, the phototransistor of the first optocoupler has its emitter connected to the ground wire of the bus and its collector coupled both to the first data wire of the bus and a predetermined supply voltage, the phototransistor of the second optocoupler has its emitter connected to the ground wire of the bus and its collector coupled both to the second data wire of the bus and the predetermined supply voltage, the light-emitting diode of the third optocoupler has its anode connected to the collector of the phototransistor of the first optocoupler and its cathode coupled to the first data wire of the bus, the light-emitting diode of the fourth optocoupler has its anode connected to the collector of the phototransistors of the second optocoupler and its cathode coupled to the second data wire of the bus, the phototransistor of the third optocoupler has its emitter connected to the ground terminal of the peripheral circuit and its collector connected to the anode of the light-emitting diode of the first optocoupler, and the phototransistor of the fourth optocoupler has its emitter connected to the ground terminal of the peripheral circuit and its collector connected to the anode of the light-emitting diode of the second optocoupler.

7. The electrical insulation circuit as defined in claim 6, wherein the first means includes first and second transmission gates, the input of the first transmission gate is connected to the collector of the first phototransistor and the output of the first transmission gate is connected to the first data wire of the bus, the input of the second transmission gate is connected to the collector of the second phototransistor and the output of the second transmission gate is connected to the second data wire of the bus, and the first and second transmission gates are activated only when the phototransistors of the first and second optocouplers are off.

8. The electrical insulation circuit as defined in claim 6, wherein the second means includes first and second diodes, the first diode is connected in reverse to the terminals of the light-emitting diode of the first optocoupler, and the second diode is connected in reverse to the terminals of the light-emitting diode of the second optocoupler.

9. The electrical insulation circuit as defined in claim 6, further comprising:

first and second transmission gates, wherein the input of the first transmission gate is connected to the first data wire of the bus and the output of the first transmission gate is connected to the cathode of the light-emitting diode of the third optocoupler, the input of the second transmission gate is connected to the second data wire of the bus and the output of the second transmission gate is connected to the cathode of the light-emitting diodes of the fourth optocoupler, and the second and third transmission gates are permanently active.

10. The electrical insulation circuit as defined in claim 7, further comprising:

third and fourth transmission gates,
wherein the input of the third transmission gate is connected to the first data wire of the bus and the output of the third transmission gate is connected to the cathode of the light-emitting diode of the third optocoupler,
the input of the fourth transmission gate is connected to the second data wire of the bus and the output of the fourth transmission gate is connected to the cathode of the light-emitting diodes of the fourth optocoupler, and
the third and fourth transmission gates are permanently active.

11. The electrical insulation circuit as defined in claim 6, further comprising a voltage regulator for setting the level of the predetermined supply voltage.

12. A computer system comprising:
a peripheral circuit that includes a supply terminal, a ground terminal, and first and second signal terminals;
a two-way bus that includes at least one supply wire, a ground wire, and first and second data wires, each of the data wires conveying differential data signals in both directions; and
an electrical insulation circuit connected between the peripheral circuit and the two-way bus, the electrical insulation circuit including first and second optocouplers for transmitting differential signals in the peripheral circuit-to-bus direction, and third and fourth optocouplers for transmitting differential signals in the bus-to-peripheral circuit direction,
wherein the first and third optocouplers are associated with the first signal terminal on the peripheral circuit side and with the first data wire on the bus side,
the second and fourth optocouplers are associated with the second signal terminal on the peripheral circuit side and with the second data wire on the bus side, and
the first and third optocouplers and the second and fourth optocouplers are connected such that the first and second optocouplers are off during the transmission of differential signals in the bus-to-peripheral circuit direction and the third and fourth optocouplers are off during the transmission of differential signals in the peripheral circuit-to-bus direction.

13. The computer system as defined in claim 12, wherein the electrical insulation circuit including further includes:
first means for applying the differential signal from the first and second optocouplers to the first and second data wires of the bus solely during the transmission of signals in the peripheral circuit-to-bus direction; and
second means for applying the differential signal from the third and fourth optocouplers to the first and second signal terminals of the peripheral circuit solely during the transmission of signals in the bus-to-peripheral circuit direction.

14. The computer system as defined in claim 13,
wherein the first and second optocouplers each include a light-emitting diode on the peripheral circuit side and a phototransistor on the bus side, the phototransistor, cooperating with the diode to transmit the differential signals in the peripheral circuit-to-bus direction, and
the third and fourth optocouplers each include a light-emitting diode on the bus side and a phototransistor on the peripheral circuit side, the phototransistor cooperating with the diode to transmit the differential signals in the bus-to-peripheral circuit direction.

15. The computer system as defined in claim 14,
wherein the light-emitting diode of the first optocoupler has its anode connected though a first resistor to the supply terminal of the peripheral circuit and its cathode connected to the first signal terminal of the peripheral circuit,
the light-emitting diode of the second optocoupler has its anode connected through a second resistor to the supply terminal of the peripheral circuit and its cathode connected to the second signal terminal of the peripheral circuit,
the phototransistor of the first optocoupler has its emitter connected to the ground wire of the bus and its collector coupled both to the first data wire of the bus and a predetermined supply voltage,
the phototransistor of the second optocoupler has its emitter connected to the ground wire of the bus and its collector coupled both to the second data wire of the bus and the predetermined supply voltage,
the light-emitting diode of the third optocoupler has its anode connected to the collector of the phototransistor of the first optocoupler and its cathode coupled to the first data wire of the bus,
the light-emitting diode of the fourth optocoupler has its anode connected to the collector of the phototransistors of the second optocoupler and its cathode coupled to the second data wire of the bus,
the phototransistor of the third optocoupler has its emitter connected to the ground terminal of the peripheral circuit and its collector connected to the anode of the light-emitting diode of the first optocoupler, and
the phototransistor of the fourth optocoupler has its emitter connected to the ground terminal of the peripheral circuit and its collector connected to the anode of the light-emitting diode of the second optocoupler.

16. The computer system as defined in claim 15,
wherein the first means includes first and second transmission gates,
the input of the first transmission gate is connected to the collector of the first phototransistor and the output of the first transmission gate is connected to the first data wire of the bus,
the input of the second transmission gate is connected to the collector of the second phototransistor and the output of the second transmission gate is connected to the second data wire of the bus, and
the first and second transmission gates are activated only when the phototransistors of the first and second optocouplers are off.

17. The computer system as defined in claim 15,
wherein the second means includes first and second diodes,
the first diode is connected in reverse to the terminals of the light-emitting diode of the first optocoupler, and
the second diode is connected in reverse to the terminals of the light-emitting diode of the second optocoupler.

18. The computer system as defined in claim 15, wherein the electrical insulation circuit including further includes:
first and second transmission gates,
wherein the input of the first transmission gate is connected to the first data wire of the bus and the output of the first transmission gate is connected to the cathode of the light-emitting diode of the third optocoupler,
the input of the second transmission gate is connected to the second data wire of the bus and the output of the second transmission gate is connected to the cathode of the light-emitting diodes of the fourth optocoupler, and the second and third transmission gates are permanently active.

19. The computer system as defined in claim 15, wherein the electrical insulation circuit including further includes a voltage regulator for setting the level of the predetermined supply voltage.

* * * * *